(12) United States Patent
Stranz et al.

(10) Patent No.: US 10,124,389 B2
(45) Date of Patent: Nov. 13, 2018

(54) VEHICLE AXLE

(71) Applicants: Andreas Stranz, Munich (DE); Edward William Schleichert, Munich (DE)

(72) Inventors: Andreas Stranz, Munich (DE); Franz Trubert, Munich (DE); Edward William Schleichert, Munich (DE)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 15/633,952

(22) Filed: Jun. 27, 2017

(65) Prior Publication Data

US 2017/0291207 A1 Oct. 12, 2017

Related U.S. Application Data

(63) Continuation of application No. 13/681,003, filed on Nov. 19, 2012, now abandoned.

(60) Provisional application No. 61/565,613, filed on Dec. 1, 2011.

(51) Int. Cl.
| | |
|---|---|
| *B21D 22/16* | (2006.01) |
| *B60G 21/05* | (2006.01) |
| *B21D 53/88* | (2006.01) |
| *B21D 47/01* | (2006.01) |

(52) U.S. Cl.
CPC ............. *B21D 22/16* (2013.01); *B21D 47/01* (2013.01); *B21D 53/88* (2013.01); *B60G 21/051* (2013.01); *B60G 2200/21* (2013.01); *B60G 2206/20* (2013.01); *B60G 2206/202* (2013.01); *B60G 2206/80* (2013.01); *B60G 2206/81* (2013.01); *B60Y 2304/03* (2013.01); *B60Y 2304/05* (2013.01)

(58) Field of Classification Search
CPC ................ B21D 22/16; B60G 2206/81; B60G 2206/202; B60G 21/051
See application file for complete search history.

(56) References Cited

U.S. PATENT DOCUMENTS

| | | | | |
|---|---|---|---|---|
| 4,380,480 A | * | 4/1983 | Delfino | ..................... B21K 1/06 |
| | | | | 148/570 |
| 6,487,886 B2 | * | 12/2002 | Ueno | .................... B21D 22/105 |
| | | | | 301/124.1 |

(Continued)

FOREIGN PATENT DOCUMENTS

WO WO-2010043036 A1 * 4/2010 ............... B21C 1/24

*Primary Examiner* — James A English
(74) *Attorney, Agent, or Firm* — Dickinson Wright PLLC

(57) ABSTRACT

A traverse strut for use in a twist beam axle assembly is provided. The traverse strut extends along a length and presents a central section; a pair of end sections; and a pair of intermediate sections between the central section and the respective end sections. At least a portion of the central section has a first wall thickness, at least a portion of each end section has a second wall thickness that is greater than the first wall thickness and at least a portion of each intermediate section has a third wall thickness that is greater than the second wall thickness. Additionally, at least two of the central, intermediate and end sections is work hardened. The transverse strut has improved performance and lower weight as compared to other known transverse struts.

8 Claims, 5 Drawing Sheets

(56) References Cited

U.S. PATENT DOCUMENTS

| | | | | |
|---|---|---|---|---|
| 7,601,232 B2* | 10/2009 | Fonte | ............... | C22F 1/183 |
| | | | | 148/670 |
| 8,353,562 B2* | 1/2013 | Spielmann | ............... | B21K 1/06 |
| | | | | 301/124.1 |
| 2011/0260423 A1* | 10/2011 | Lepre | ............... | B21C 1/24 |
| | | | | 280/124.131 |
| 2012/0031516 A1* | 2/2012 | Yori, III | ............... | B21J 5/063 |
| | | | | 138/103 |

\* cited by examiner

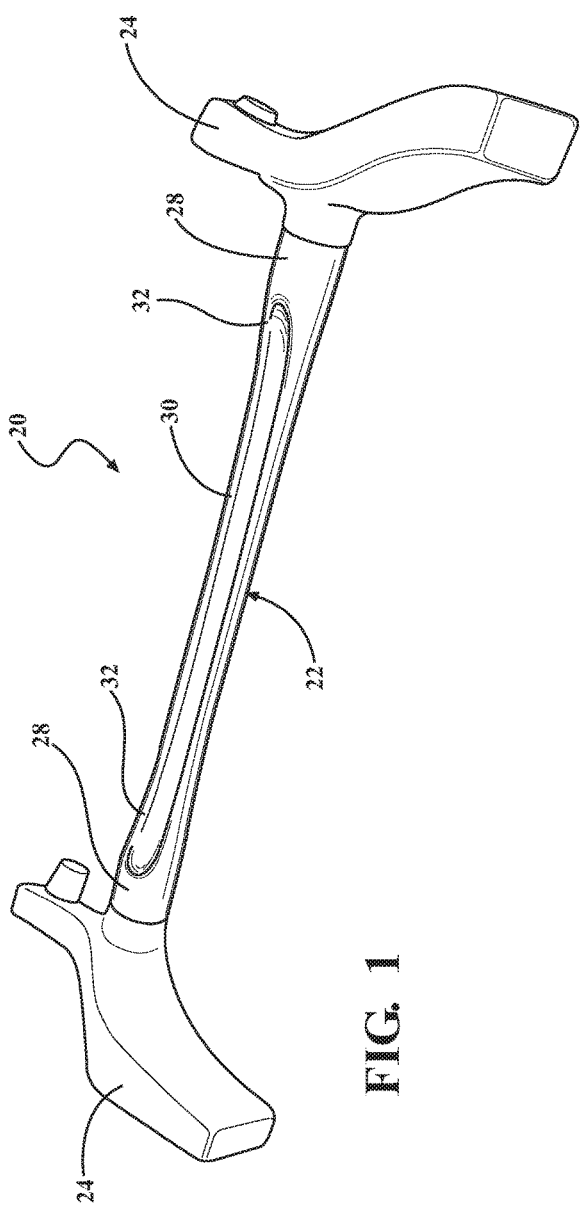
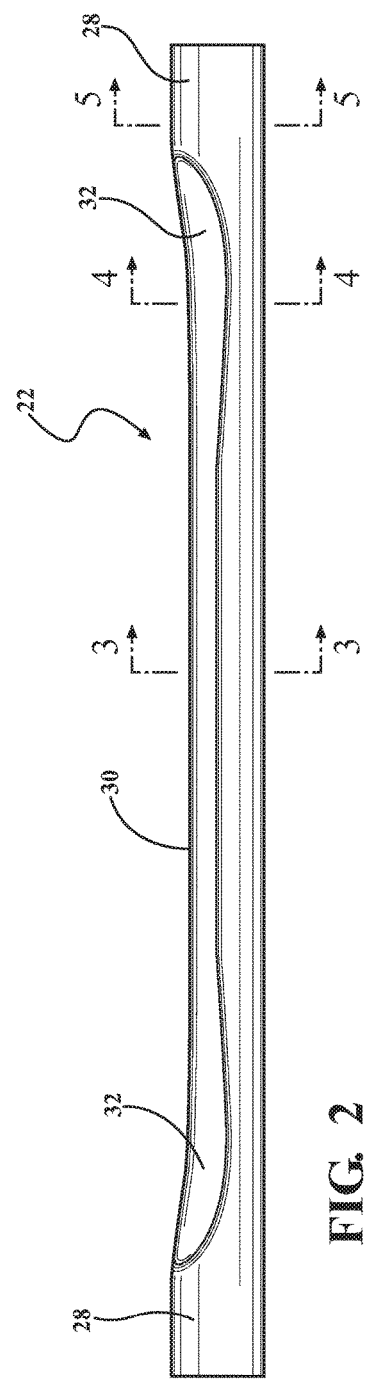
FIG. 1
FIG. 2

VEHICLE AXLE

CROSS REFERENCE TO RELATED APPLICATION

This Continuation patent application claims the benefit of U.S. patent application Ser. No. 13/681,003 filed Nov. 19, 2012 which claims the benefit of U.S. Provisional Patent Application Ser. No. 61/565,613 filed Dec. 1, 2011, entitled "Vehicle Axle," the entire disclosures of the applications being considered part of the disclosure of this application and hereby incorporated by reference.

BACKGROUND OF THE INVENTION

1. Field of the Invention

The present invention relates in general to vehicle axles and more particularly to twist beam rear axle assemblies for vehicles and yet more specifically, to a transverse strut of a twist beam axle assembly that interconnects two longitudinal control arms.

2. Related Art

A twist beam rear suspension, also known as a torsion beam axle, is a type of automobile suspension including a pair of control arms, each coupled with a wheel of a vehicle, and a transverse strut extending between the control arms. During operation of the vehicle, the transverse strut deforms in a twisting movement when one of the wheels moves relative to another, for example during roll of the vehicle or when one of the vehicle's wheels encounters, for example, a pothole in the road. The twisting movement of the transverse strut absorbs the movement.

Generally, such transverse struts are formed through roll forming, extruding, forging and/or machining processes. However, transverse struts formed through such processes are often heavy, requiring substantial amounts of material to meet desired performance characteristics. As manufacturers continually strive to reduce weight from vehicles to improve fuel economy, some manufacturers have attempted to use expensive alloys to reduce weight. While these alloys may reduce the weight of the twist beam axle, they also raise its material and manufacturing costs. Therefore, there is a continuing need for a transverse strut with reduced weight that meets or exceeds desired performance characteristics without resorting to expensive alloys that would increase the cost.

SUMMARY OF THE INVENTION

One aspect of the present invention provides for an improved transverse strut for use in a twist axle assembly of a vehicle. The transverse strut according to this aspect of the present invention includes an elongated and tubular body extending along a length between opposite end sections and having a varying wall thickness between the opposite end sections. Specifically, the elongated body includes a central section and a pair of intermediate sections disposed between the central section and the end sections. At least a portion of the central section has a first wall thickness and at least a portion of each of the end sections has a second wall thickness that is greater than the first wall thickness. Additionally, at least a portion of each of the intermediate sections has a third wall thickness which is greater than the second wall thickness. Further, at least two of the central, intermediate and end sections are work hardened. The transverse strut according to this aspect of the present invention solves many of the shortcomings of the other known transverse strut because it has a variable wall thickness that provides it with desired torsional characteristics while also reducing weight and material costs.

Another aspect of the present invention is a method of making a transverse strut for a twist rear axle assembly. The method includes the step of sliding a preform having a generally cylindrical shape onto a mandrel and wherein the preform extends along a predetermined length along an axis between opposite ends. The method continues with either forward or reverse flow forming the preform into a transverse strut. Either flow forming process includes the steps of rotating the preform about an axis and deforming material of the preform in an axial direction with at least one roller during the rotating of the preform to produce a tubular body having a central section, a pair of end sections and a pair of intermediate sections between the end sections. Specifically, the material is deformed so that at least a portion of the central section has a first wall thickness, at least a portion of each end section has a second wall thickness that is greater than the first wall thickness and at least a portion of each intermediate section has a third wall thickness that is greater than the second wall thickness. This process may be less costly than other processes for forming transverse struts and results in an end product with desirable torsion properties with reduced weight as compared to other known transverse struts. Additionally, the deformation step work hardens at least a portion of the resulting transverse strut, which may lead to cost savings by eliminating the need for post shaping treatment operations. Another advantage is that the resulting transverse strut may be longer than the preform from which it was shaped. Accordingly, smaller preforms may be sent to the factory where they are shaped, leading to shipping advantages. Even further, the flow forming process does not result in any scrap material, thereby leading to material savings as compared to other known processes for forming transverse struts.

If forward flow forming is employed, then the deformation of the material is in the direction of the movement of the at least one roller relative to the mandrel. This is in contrast to reverse flow forming during which the deformation of the material is in a direction opposite of the movement of the at least one roller relative to the mandrel.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 is a perspective view of a twist beam axle assembly including a transverse strut constructed according to one aspect of the present invention;

FIG. 2 is a perspective view of the transverse strut in FIG. 1;

DETAILED DESCRIPTION OF THE ENABLING EMBODIMENTS

Figure 3:
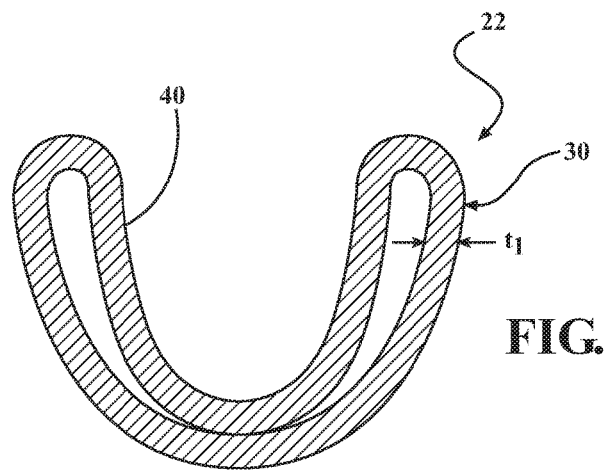
FIG. 3 is a cross-sectional view of the exemplary transverse strut taken along line 3-3 of FIG. 2.

Referring to the drawings, wherein like numerals indicate corresponding parts throughout the several views, an exemplary twist beam axle assembly 20 including a transverse strut 22 constructed according to one aspect of the present invention is generally shown in FIG. 1. As shown, the twist beam axle assembly 20 includes a pair of control arms 24 attached to either side of the transverse strut 22 for attachment to wheels (not shown) of a vehicle (not shown). The control arms 24 are formed as separate pieces from the transverse strut 22 and are subsequently joined to the transverse strut 22. The longitudinal control arms 24 may be formed in a variety of sizes, shapes and configurations depending largely upon the vehicle in which the twist beam axle assembly 20 is to be placed.

Referring now to FIG. 2, the exemplary transverse strut 22 is generally shown. The exemplary transverse strut 22 includes a pair of end sections 28, a central section 30 disposed between the end sections 28 and a pair of intermediate sections 32 (or transition sections) which extend between the central section 30 and the respective end sections 28. In the exemplary embodiment, each of the end sections 28 has a generally circular profile, the central section 30 has a generally U-shaped profile and the intermediate sections 32 have a profile which gradually and smoothly transitions from the U-shaped profile of the central section 30 to the circular profile of the end sections 28. However, it should be appreciated that other configurations for the central, intermediate and end sections 30, 32, 28 are contemplated.

Figure 4:
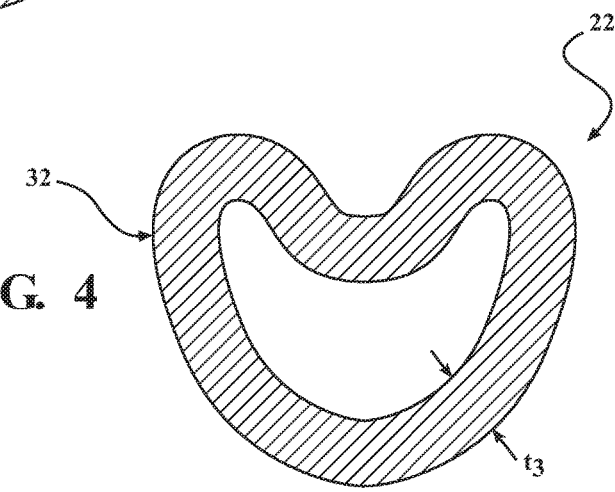
FIG. 4 is a cross-sectional view of the exemplary transverse strut taken along line 4-4 of FIG. 2.
Figure 5:
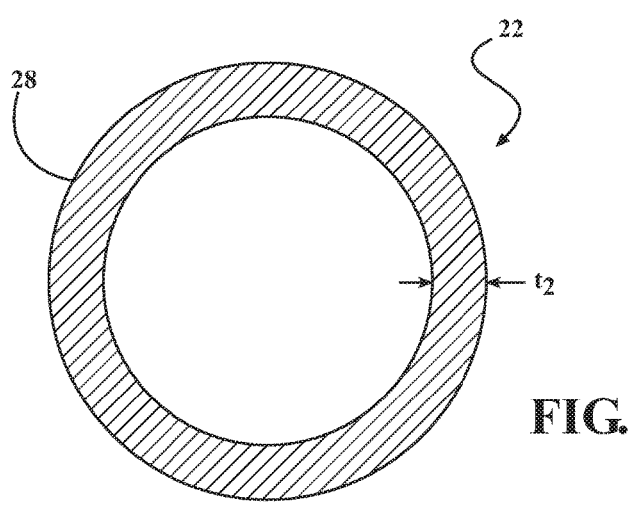
FIG. 5 is a cross-sectional view of the exemplary transverse strut taken along line 5-5 of FIG. 2.

Referring now to FIGS. 3-5, which are cross-sectional views taken through the central section 30, one of the intermediate sections 32 and one of the end sections 28 respectively, the exemplary transverse strut 22 has a varying wall thickness along its length. Specifically, the central section 30 has a first wall thickness $t_1$, the end sections 28 have a second wall thickness $t_2$ that is greater than the first wall thickness $t_1$ and the intermediate portions have a third wall thickness $t_3$ that is greater than the second wall thickness $t_2$. In other words, in the exemplary transverse strut 22, the central section 30 has the thinnest wall thickness and the intermediate sections 32 have the thickest wall thickness with the end sections' 28 wall thicknesses falling between those of the central and intermediate sections 30, 32. This is advantageous because the intermediate sections 32, which undergo the most stress during twisting of the transverse strut 22, are reinforced with additional material as compared to the central and end sections 30, 28. Likewise, the central section 30, which undergoes the least amount of stress during twisting of the transverse strut 22, has very thin walls to save material and weight. Preferably, the central section 30 has the first wall thickness along substantially its entire length and the end sections 28 have the second wall thickness substantially along their entire lengths, whereas the wall thickness is varied across along the intermediate sections 32. In other words, the wall thicknesses of the intermediate sections 32 increases progressively from adjacent the central section 30 to the area with the third wall thickness $t_3$ and increases progressively from adjacent the associated end section 28 to the area with the third wall thickness $t_3$. However, it should be appreciated that the wall thickness of the transverse strut 22 could alternately include steps at or near the boundaries between the central section 30 and the intermediate sections 32 and between the intermediate sections 32 and the end sections 28. In the exemplary embodiment, the wall thickness $t_1$ of the central section 30 is approximately 2.2 mm, the second wall thickness $t_2$ of the end sections 28 is approximately 3.0 mm and the third wall thickness $t_3$ of the intermediate sections 32 is between 3.1 and 3.3 mm.

Because of its variable thickness, the exemplary transverse strut 22 has increased performance and a reduced weight as compared to other known transverse struts with generally uniform wall thicknesses. Additionally, as will be discussed in further detail below, at least the intermediate and end sections 32, 28 are work hardened to improve the transverse strut's 22 performance.

Figure 6:
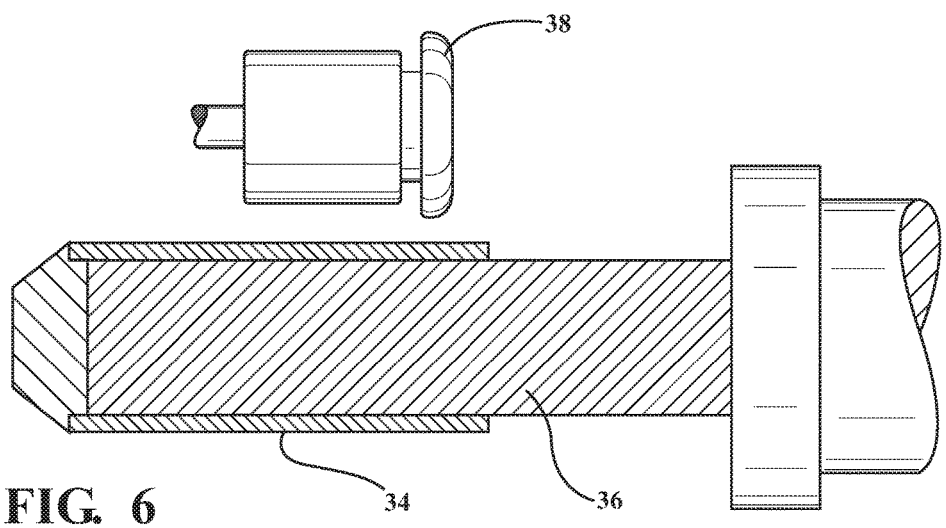
FIG. 6 is a cross-sectional view of a setup for forward flow forming a preform into a transverse strut.

Another aspect of the present invention is a method of making a transverse strut 22 for a twist beam axle assembly 20 through a forward or reverse flow forming process. An exemplary setup for making the transverse strut 22 through the forward flow forming process is shown in FIG. 6. The exemplary method starts with sliding or otherwise placing a preform 34 having a generally cylindrical shape onto a driven mandrel 36. The preform 34 starts with a predetermined length, a generally uniform wall thickness and a generally uniform outside diameter. For example, the length could be 700 mm, the wall thickness could be 3.5 mm and the outside diameter could be 90 mm.

Figure 7:
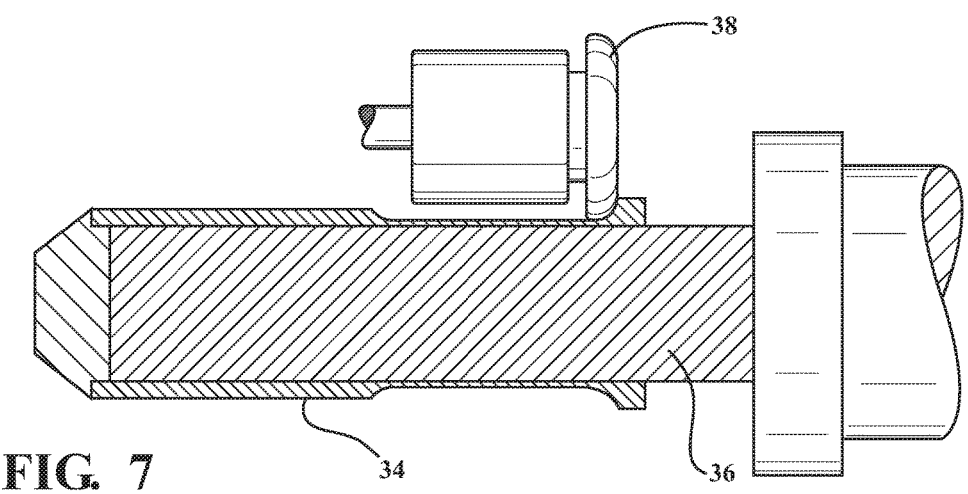
FIG. 7 is a cross-sectional view of a transverse strut during the forward flow forming process.

Referring now to FIG. 7, the method continues with rotating the mandrel 36 and the preform 34 along an axis and plastically deforming material in an axial direction with at least one roller 38 during the rotating of the preform 34. Preferably, three rollers 38 generally uniformly spaced from one another are employed to plastically deform the material of the preform 34. The rollers 38 are moved relative to the spinning mandrel 36 (or vice versa) through a predetermined path to both lengthen the preform 34 and also to adjust the wall thicknesses of the preform 34 at predetermined areas so that it has a central section 30 with a first wall thickness $t_1$, a pair of end sections 28 with a second wall thickness $t_2$ greater than the first wall thickness $t_1$ and a pair of intermediate sections 32 with a third wall thickness $t_3$ greater than the second wall thickness $t_2$ like the transverse strut 22 shown in FIG. 2 and discussed above. Preferably, three rollers 38 generally uniformly spaced from one another around the mandrel 36 are employed to shape the preform 34. After the flow forming process is completed, the method may proceed with the step of pressing a pocket 40 into the preform 34 to give the central section 30 the generally U-shaped profile discussed above and shown in FIG. 3. This pocket 40 cooperates with the reduced wall thickness in the central section 30 to improve the torsional stiffness characteristics of the transverse strut 22. The length, depth and shape of the pocket 40 may be chosen to provide the transverse strut 22 with desired performance characteristics.

The preform 34 (and thus the resulting transverse strut 22) may be formed of a range of different metals including, for example, steel, alloyed steel, aluminum, nickel, etc. No material is cut or otherwise separated from the preform 34 during the flow forming process, and thus, the resulting transverse strut 22 has the same volume of material as the preform 34 from which it was formed. However, because material is deformed axially, the resulting transverse strut 22 may be longer than the preform 34 from which it originated. Preferably, the transverse strut 22 is between fifty and sixty percent (50-60%) longer than the preform 34 from which it originated.

In addition to shaping the material, the plastic deforming process has the effect of work hardening the material of the transverse strut 22, thereby improving its performance when installed in a twist beam axle assembly 20. This may provide for cost savings by eliminating or at least reducing the need for post shaping treatment operations to increase the transverse strut's strength. However, if desired, the transverse strut 22 may still undergo post shaping treatment operations. A heat treatment process may be required to normalize or recrystallize the work-hardened material of the transverse strut 22 before pressing the pocket 40 into the transverse strut 22 to give the central section 30 the generally U-shaped cross-section.

Although not shown, it may be desirable to continually splash a cooling fluid onto the preform 34 during the deformation process to prevent excessive heat from being built up on the preform 34 as it is being shaped.

Figure 8:
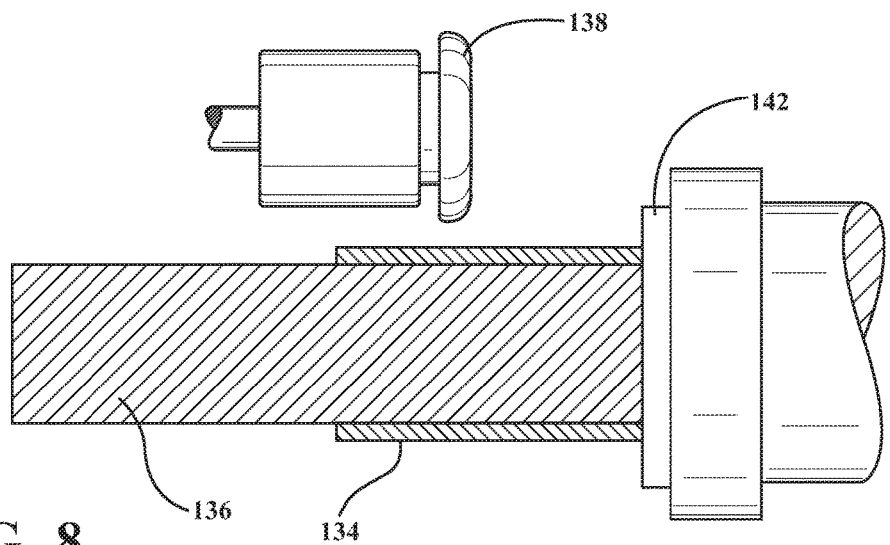
FIG. 8 is a cross-sectional view of a setup for reverse flow forming a preform into a transverse strut.
Figure 9:
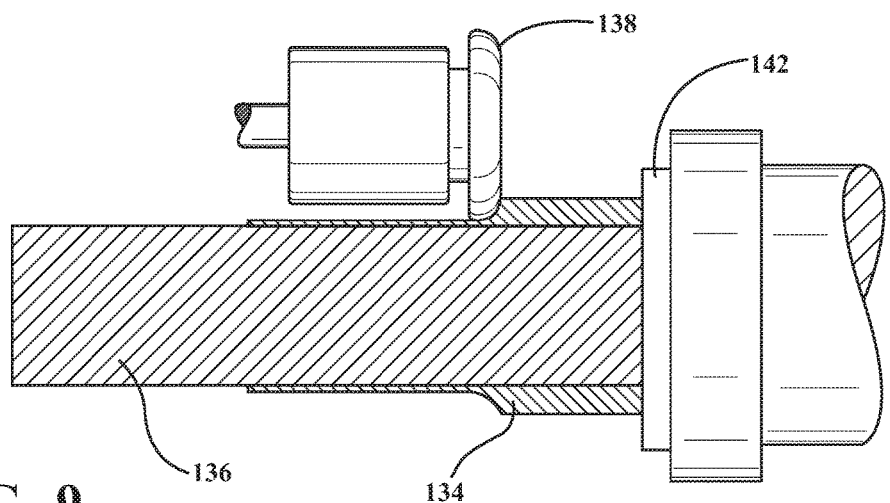
FIG. 9 is a cross-sectional view of a transverse strut during the reverse flow forming process.

During the forward flow forming process, material is moved axially in the direction of the movement of the roller 38 relative to the mandrel 36. This is in contrast to reverse flow forming, in which material moves axially in a direction opposite of the movement of the roller 138. Referring now to FIG. 8, wherein the same reference numerals, offset by a factor of, are used to identify similar features as discussed above, a setup for shaping a preform 134 into a transverse strut 22 (such as the transverse strut shown in FIG. 2) through a reverse flow forming process is shown. In contrast to forward flow forming where material is deformed in the direction of the roller's movement, in reverse flow forming, material of the preform 134 is deformed in an axial direction opposite of the direction of the roller 138. This process may result in lower production times as compared to the forward flow forming process discussed above because the rollers 138 only have to traverse the length of the preform 134, not the entire finished length of the transverse strut 22 (which may be longer than the preform 134) as is required in forward flow forming.

Figure 10:
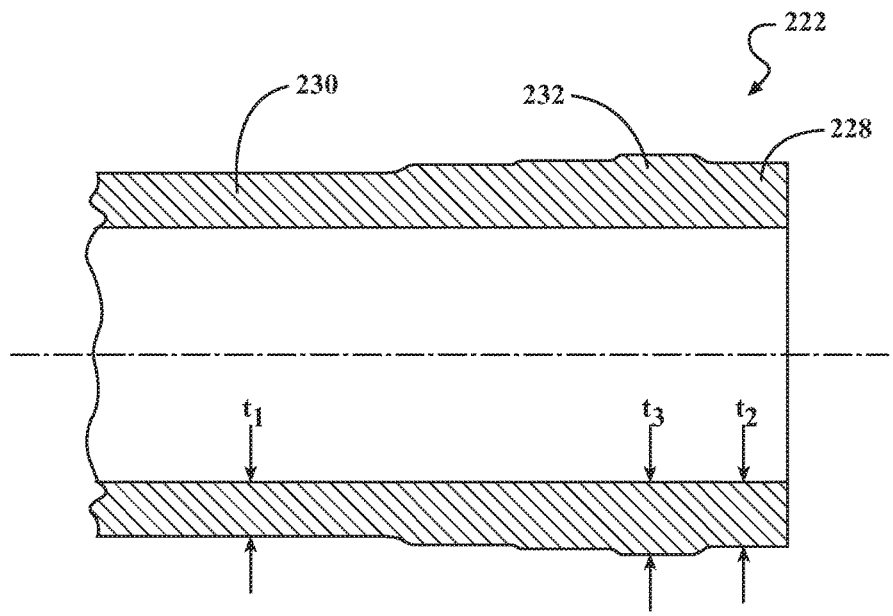
FIG. 10 is a cross-sectional view of another transverse strut formed through a flow forming process.
Figure 11:
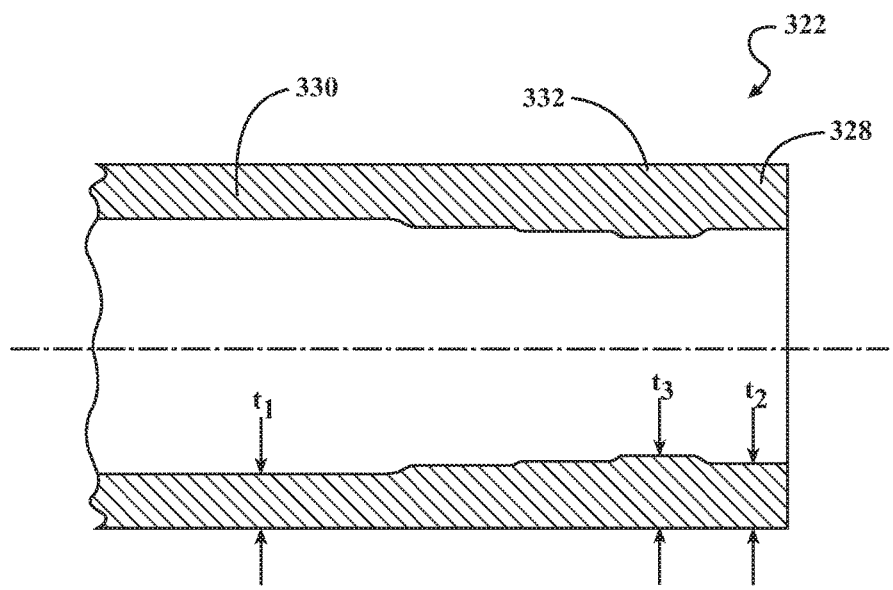
FIG. 11 is a cross-sectional view of yet another transverse strut formed through a flow forming process.

Referring now to FIG. 10, an exemplary transverse strut 222 formed through a flow forming process is generally shown in cross-section. As shown, this exemplary transverse strut 222 has a central section 230 with a first wall thickness $t_1$, an end section 228 with a second wall thickness $t_2$ greater than the first wall thickness $t_1$, and an intermediate section 232 with a third all thickness $t_3$ greater than the second wall thickness $t_2$. The interior surface of the transverse strut 222 is generally smooth because material on the exterior has been deformed to create the variable wall thicknesses. In another embodiment shown in FIG. 11, a transverse strut 322 having central, end and intermediate sections 330, 328, 332 with variable first, second and third wall thicknesses $t_1$, $t_2$, $t_3$ respectively. In this embodiment, the exterior surface of the transverse strut 322 is generally smooth because material on the interior has been deformed to create the variable wall thicknesses.

Obviously, many modifications and variations of the present invention are possible in light of the above teachings and may be practiced otherwise than as specifically described while within the scope of the appended claims.

What is claimed is:

1. A method of making a transverse strut for a twist ear axle assembly, comprising the steps of:
    sliding a metal preform, which is made of steel or an alloy steel or aluminum or nickel and which has a wall thickness of approximately 3.5 mm, having a generally cylindrical shape onto a mandrel and wherein the preform extends a predetermined length along an axis between opposite ends;
    rotating the preform about the axis;
    simultaneous to rotating the preform about the axis step, flow forming the material of the preform in an axial direction with at least one roller during the rotating of the preform about the axis to produce a tubular body that has a central section, a pair of end sections, and a pair of intermediate sections between the end sections and the central section and wherein the tubular body has a length which is between 50 and 60 percent longer than the metal preform before the step of sliding the metal preform onto the mandrel; and
    wherein at least a portion of the central section has a first wall thickness that is approximately 2.2 mm, at least a portion of each of the end sections has a second wall thickness that is approximately 3.0 mm, and at least a portion of each of the intermediate sections has a third wall thickness that is between 3.1 and 3.3 mm.

2. The method as set forth in claim 1 further including the step of pressing the central section to give the central section a generally U-shaped profile.

3. The method as set forth in claim 1 wherein after the flow forming step, the central section has the first wall thickness along substantially its entire length.

4. The method as set forth in claim 1 wherein after the flow forming step, the end sections have the second wall thickness along substantially their entire lengths.

5. The method as set forth in claim 1 wherein after the flow forming step, each of the intermediate sections has a variable wall thicknesses which increases from said central section to said third wall thickness and which decreases from said third wall thickness to a respective one of said end sections.

6. The method as set forth in claim 1 wherein the preform has a generally uniform wall thickness before the flow forming step.

7. The method as set forth in claim 1 wherein the flow forming step includes moving the at least one roller in a first axial direction relative to the mandrel and wherein metal material of the preform is deformed in the first axial direction.

8. The method as set forth in claim 1 wherein the flow forming step includes moving the at least one roller in a first axial direction relative to the mandrel and wherein metal material of the preform is deformed in a second axial direction that is opposite of the first axial direction.

* * * * *